March 20, 1951 H. CARSON ET AL 2,545,684
PROPELLER PITCH GOVERNOR

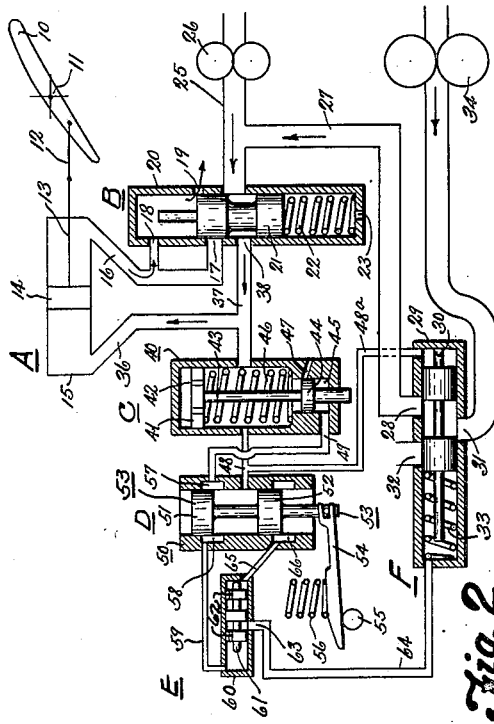

Filed Oct. 25, 1945 3 Sheets-Sheet 2

INVENTORS
HOWARD CARSON
BY JAMES W. LIGHT
Spencer Hardman & Fehr
their ATTORNEYS

INVENTORS
HOWARD CARSON
JAMES W. LIGHT

Patented Mar. 20, 1951

2,545,684

UNITED STATES PATENT OFFICE 2,545,684

PROPELLER PITCH GOVERNOR

Howard Carson and James W. Light, Dayton, Ohio, assignors to General Motors Corporation, Detroit, Mich., a corporation of Delaware Application October 25, 1945, Serial No. 624,512

7 Claims. (Cl. 170—160.21)

This invention relates to the control of pitch of propeller blades for the purpose of governing the speed of the engine driving the propeller.

This application is a continuation in part of application S. N. 564,128, filed November 18, 1944, now abandoned.

An object of the invention is to obtain, in response to relatively small deviation from selected governed speed, a rate of pitch change which is relatively small and to obtain, in response to relatively great deviation from selected governed speed, a rate of pitch change which is relatively great. A further object is to obtain more power for increasing the blade angle than for decreasing the blade angle.

Further objects and advantages of the present invention will be apparent from the following description, reference being had to the accompanying drawing, wherein a preferred embodiment of the present invention is clearly shown.

The foregoing objects are accomplished by inserting between the pressure source and the decrease pitch chamber of a fluid pressure torque unit a combination pressure limiting and regulator valve which will at all times maintain a fairly constant pressure in the decrease pitch line which pressure will be sufficient to decrease pitch under all conditions. During on-speed operation this constant pressure in the decrease pitch line which is added to the built-in tendencies of the blade to turn to the fine pitch position, is opposed by a higher pressure controlled by a pressure control valve constantly connected with the pressure source and whose action is modified by a speed responsive valve such that the opposition is gauged to balance that effected by the built-in tendencies of the blade and the maintained pressure in the decrease pitch line. During off-speed operation if the deviation is small, the speed responsive valve so modifies the action of the pressure control valve that the opposing pressure is altered sufficiently to effect blade change through the operation of the torque unit. If the off-speed deviation is large, then the speed responsive valve, operating in communication with a shuttle valve, operates to cut in a supplemental supply of fluid pressure to effect blade shift to satisfy the greater demands. When the off-speed is an increase of speed, the opposing pressure is increased so as to effect an increase pitch shift. When the off-speed is a decrease of speed, the opposing pressure is decreased so as to permit the constant pressure in the decrease pitch line to effect decrease pitch of the blades. Otherwise, the summation of forces on the movable element of the torque unit are in balance and tend to hold the blade against any shift during on-speed operation.

In the drawing:

Figs. 1, 2 and 3 are diagrams showing the operation, under different conditions, of an embodiment of the invention.

Figure 4:
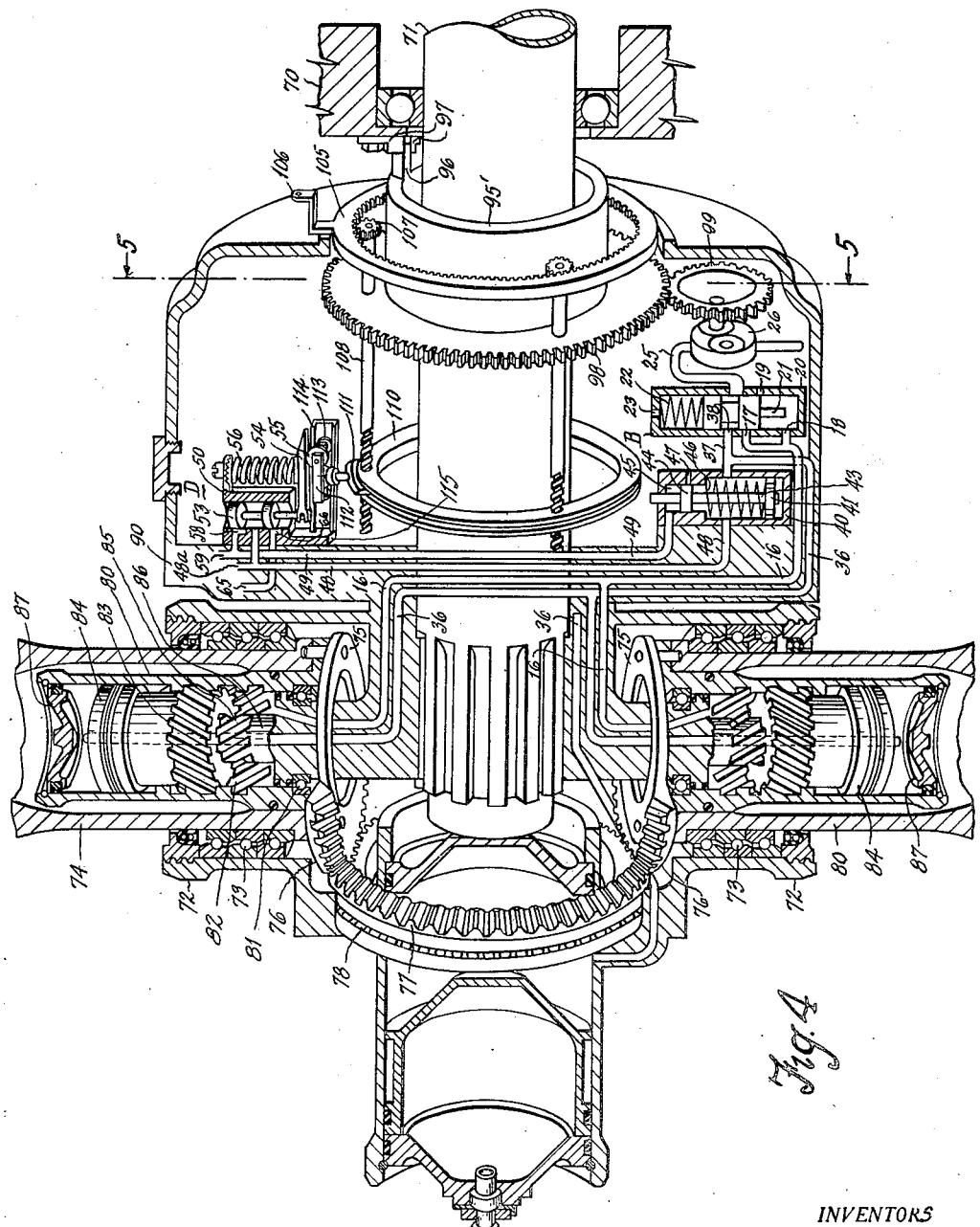
Fig. 4 is a longitudinal sectional view in perspective of a propeller hub assembly of a type with which the present invention is adapted for use. The pressure-oil ducts are shown somewhat diagrammatically.

Referring to Fig. 1, a propeller blade 10 is adjustable about its root axis 11 by the operation of a torque motor A. Diagrammatically, its root is connected by a link 12 with a piston rod 13 connected with a piston 14 movable in a cylinder 15, the right end of which is connected by a pipe 16 with ports 17 and 18 in a cylinder 20 having a drain port 19. A piston 21 slides in the cylinder 20 and is under control by centrifugal force acting in the direction of arrow 21a and by fluid pressure in the upper end of the cylinder and by a spring 22 in the lower end of the cylinder which is vented at 23. Cylinder 20 and piston 21 provides valve B which limits pressure against the right face of servo piston 14. As propeller speed increases, the value of this pressure increases, because more pressure force is required to move valve 21 into position for opening the drain port 19.

This follows from the fact that the valve unit B is mounted on a rotating part of the propeller in such position that centrifugal force acts upon the piston 21 in a radially outward direction as indicated by the arrow 21a, and in assisting relation with respect to the spring 22. These forces are opposed by fluid pressure existent in the chamber 15 at right of servo-piston 14 which is communicated to the top of piston 21 through pipe 16 and port 18 and under the more or less present urge of the source pressure at left of 14 which tends to fluid at right of 14 and in 16. That pressure above the piston 21 opposes the centrifugal and spring force on the piston so far as to move the piston downward to at least partly uncover the drain port 19, and a condition will soon be reached in which during on-speed operation the drain at 19 allows the piston 21 to stand still with the flow from the port 19 offsetting the feed of pressure through 17 to the pitch decrease line 16. If the pressure in 16 increases for any reason then the piston 21 will be forced downward more to open the port 19 to a greater extent, thereby relieving that pressure increase. Similarly, if there is a fall of pressure in pipe 16 for any reason, the valve 21 moves upward and closes off the port 19 so that there is less drain which allows the pressure to build up in pipe 16. At an increase of propeller speed more centrifugal force is assisting the spring 22 to such an extent that the port 19 tends to close a little more and the port 17 to open a little wider to admit more pressure opposing the spring and centrifugal force. For a decrease in propeller speed the opposite obtains.

Cylinder 20 is connected by pipe 25 with a source of pressure provided by a pump 26 of relatively low capacity, and by pipe 27 with a selector valve F comprising a cylinder 29 having ports 28, 31 and 32 controlled by a piston 30 under control by pressures at opposite ends of the cylinder and by a spring 33. Port 31 is connected with an auxiliary source of pressure provided by a pump or pumps 34 of relatively high capacity.

The left end of cylinder 15 of servo A is connected by pipe 36 with a pipe 37 connected with a port 38 in cylinder 29 and with a cylinder 40 of a valve C receiving a dash pot piston 41 having leak notches 42 and connected by a rod 43 with a small piston 44 received by a cylinder 45. Piston 44, which controls the opening and closing of a bleed port 47, is under control by centrifugal force acting in the direction of arrow 44a and by pressures above and below it and by a spring 46. Thus, the force of pressure in cylinder 45, the force of spring 46 and centrifugal force acting on the rod 43 tend to move it upward in the direction of arrow 44a and in opposition to the force of pressure in the cylinder 40 acting downwardly on the end of the small piston 44. When the propeller is on speed and the piston 14 of torque unit A should remain stationary, the pressure at the left of piston 14 should be limited to a value such that all forces acting on the piston 14 (including centrifugal blade torque) will be in balance. As will be explained later, when on-speed, the unit pressure below piston 44 is substantially lower than the unit-pressure above it. The total pressure above piston 44 overcomes the spring 46 and the action of centrifugal force sufficiently to cause piston 44 to open the bleed port 47 sufficiently to limit the pressure to the left of piston 14 to such value that the piston 14 will be in balance. As propeller speed increases, centrifugal force acting on piston 44 increases and greater pressure is required to effect opening of bleed port 47. Hence the pressure to the left of piston 14 increases. As stated before, as propeller speed increases, greater pressure is required to effect opening of bleed port 19 of unit B. Hence the pressure to the right of piston 14 increases. The pressure increases on both sides of piston 14 are commensurate. That is, for each position of piston 14 corresponding to a different speed-setting of the apparatus, when the apparatus is in the on-speed status, the piston will be held stationary by higher pressures when the propeller speed is high and by lower pressures when the propeller speed is low.

Cylinder 40 is connected by pipe 48 with a cylinder 50 of a speed responsive valve-unit D; and pipe 48 is connected by pipe 48a with the right end of cylinder 29. Cylinder 50 receives the lands 51 and 52 of a valve 53 connected with a lever 54 urged against an adjustable fulcrum 55 by a spring 56. Valve 53 is radially movable relative to the axis of rotation of the propeller hub in response to change of propeller speed and is therefore under control by centrifugal force acting in the direction of arrow 53a and by the spring 56, the effect of which is varied by moving the fulcrum 55 horizontally as viewed in the drawing. Land 51 controls a port 57 connected by a pipe 49 with the cylinder 45, and a port 58 connected by a pipe 59 with a cylinder 60 of a shuttle valve E. Land 51 and ports 57 and 58 have the same width. Land 52 controls a port 66 which is so spaced with respect to ports 57, 58 and the lands 51, 52 that the port 66 is partly open to drain when the ports 57, 58 are completely covered by the land 51.

Shuttle valve E comprises cylinder 60 receiving a piston valve 61 having notched end lands 62 controlling a port 63 connected by pipe 64 with the left end of cylinder 29 of selector valve F. The right end of cylinder 60 is connected by pipe 65 with the port 66 of cylinder 50 of speed responsive valve D.

Fig. 1 shows an on-speed position. Pump 26 is connected with ports 28, 24, 17 and 38. Upper end of cylinder 20 has pressure which balances spring 22. Piston 21 tends to maintain pressure (constant at a given propeller speed) in right end of servo cylinder 15 and upon the right face of piston 14 in the direction tending to decrease pitch of propeller blade 10. When on speed, the valve land 51 vibrates closely adjacent to ports 57 and 58 substantially as disclosed in the U. S. Patent 2,407,791 to Martin et al., of September 17, 1946, so that ports 57 and 58 receive a pressure substantially less than the pressure in pipe 48, cylinder 40 and pipe 37. That is because the valve land 51 in vibrating alternately opens 57 and 58 to pump pressure from 48 and to drain out of the top end of cylinder 50. At the same time land 52 is vibrating with respect to the port 66 but only to such a degree that the port 66 remains more or less open to drain from the bottom of the cylinder 50 which allows the passage 65 to remain at zero pressure. Though pressure below piston 44 is substantially lower than the pressure above it when the apparatus is in the on-speed status, the valve unit C can still control the bleed port 47 so as to maintain at the left of piston 14 the pressure required to hold the piston 14 stationary. Because the valve 53 has a vibratory controlling action, the pressure in cylinder 45 of valve C may fluctuate; but these fluctuations do not produce appreciable fluctuations of the valve 44 due to the damping action of the notched dash pot piston 41.

Since port 66 is open to drain, pipe 65 has zero pressure. The pressure in port 58 is communicated by pipe 59 to the left end of cylinder 60 of shuttle valve E. Valve 61 therefore moves right to the position shown in Fig. 1. Pressure in left end of cylinder 60 is communicated to the left end of cylinder 29 of selector valve E through the notches in left land 62 of valve 61 and the pipe 64. Since the pressure in pipe 59 is less than the pump pressure in pipes 48 and 48a, the pressure in right end of cylinder 29 is greater than the pressure in the left end of said cylinder plus the pressure of spring 33. Piston 30 of valve F remains in the position shown in Fig. 1, and pump 34 remains connected with drain.

Fig. 2 shows the condition of the apparatus when there is a substantial overspeed. Piston 53 has moved up a substantial distance to definitely connect the source pressure from 48 with ports 57 and 58. The port 66 is now more widely opened to drain which results in no pressure in 65, while the pressure in pipes 49 and 59 becomes equal to the pressure in pipes 48 and 48a. Piston 44 rises to close port 47 and the pressure rises in the left end of cylinder 15 to a value sufficient to effect increase of blade pitch. For any propeller speed, whenever there is a substantial over-speed error demanding pitch increase, the action of valve C is immediately modified to effect a pressure increase at the pitch-increasing side of the piston 14 which overbalances the pressure at the right of piston 14. Since 48a and 59 are now connected the pressure rises in the left end of cylinder 29 and becomes equal to the pressure in the right end of cylinder 29. Therefore the spring 33 moves the piston 30 right to block the drain 32 and to connect pump 34 with pipe 25. The total output of both pumps causes a rapid increase in pitch in order to reduce the overspeed. As piston 14 moves right the pressure in the upper end of cylinder 20 increases to cause piston 21 to move down to open the discharge hole 19.

Fig. 3 shows the condition of the apparatus when there is a substantial underspeed. Piston 53 has moved down a substantial distance below equilibrium position of Fig. 1 so that port 66 is closed to drain and opened to the pressure in 48 and so that ports 57 and 58 are both open to drain at the top end of the cylinder 50. Cylinder 45 has no pressure. Pressure in cylinder 40 above piston 44 moves it down to open port 47 and the pressure in left end of cylinder 15 falls rapidly below the pressure in the right end of the cylinder. Piston 14 begins moving left and pressure above piston 21 of valve B falls and spring 22 moves the piston 21 from the position shown in Fig. 1 to the position shown in Fig. 3. Port 17 is open wider and port 38 is closed. The right end of cylinder 15 receives the output of both pumps 26 and 34, and piston 14 moves left. For any propeller speed, whenever there is a substantial under-speed error demanding pitch decrease, the action of valve C is immediately modified by relieving pressure below piston 44, so that piston 44 is caused fully to open the bleed port 47 whereupon pressure to the left of piston 14 falls below pressure to the right of piston 14.

Again the piston 30 of selector valve F moves right to the same position as shown in Fig. 2 because the pressure in pipe 65 is the same as in pipe 48 and the pressures at both ends of the cylinder 29 are equal and spring 33 moves valve 30 to the position shown in Fig. 3.

From the foregoing it is apparent that the system of control includes a valve B serving as means to limit the pressure in the pitch-decreasing end of cylinder 15 to a value sufficient for decreasing the pitch. Valves D and C provide means responsive to speed for controlling the pressure in the pitch-increasing end of the cylinder 15. When on-speed, the pressure is that required to maintain the blade stationary. When overspeeding, the pressure at the left of piston 14 is increased to a value substantially above the pressure at the right of piston 14 in order to correct the overspeed error by increasing blade pitch. When underspeeding, the pressure at the left of piston 14 is reduced to a value substantially below the pressure at the right of piston 14 in order to correct underspeed error by decreasing blade pitch. Valve C controls the bleeding of a duct 36 connected with the pitch-increasing end of cylinder 15. It has a piston valve 44 which is loaded by a spring 46 and by hydraulic loading (pressure below piston 44) to oppose opening of bleed port 47 by pressure in duct 36. When there is an overspeed error, valve D effects increase in the hydraulic loading of valve 44, and when there is an underspeed error, valve D effects reduction of the hydraulic loading of valve 44.

Valves D, E and F provide speed-error controlled means for determining whether the large capacity pump shall be connected with the high pressure line 25. Valve F has a piston valve 30 which is controlled by a spring and the differential of pressures in the ends of cylinder 29. Valve D controls this differential. When on speed, the pressure in the left end of cylinder 29 is such low value, that the pressure differential opposing the spring 33 exceeds the force of the spring. Hence valve 30 is positioned for draining the large capacity pump. When there is substantial overspeed or underspeed, the pressure differential is practically zero; and spring 33 is effective to move the valve 30 to position for connecting the large capacity pump with the high pressure line. Therefore the system provides hydraulic capacity for effecting the correction of a substantial speed error; but when substantially on-speed, only the output of the small pump is required.

A structural embodiment of the present invention will now be described with reference to Figs. 4, 5 and 6. Fig. 4 shows somewhat diagrammatically a type of blade angle adjusting torque unit such as disclosed in the patents to Blanchard and MacNeil, Nos. 2,307,101 and 2,307,102, issued January 5, 1943. Referring to Fig. 4, engine frame 70 supports an engine driven shaft 71 which supports and drives a hub 72 providing bearings 73 for the roots of blades 74, each of which is attached to a ring 75 providing a bevel gear 76 meshing with a master or equalizing gear 77 journaled in a bearing 78 provided by the hub 72. Each blade 74 is connected with a cylinder 80 rotatably supported by a bearing 81 provided by the hub 72. Cylinder 80 has internal helical splines 82 mating with external helical splines 83 of a piston 84 reciprocable in the cylinder 80. Piston 84 has internal helical splines mating with external helical splines 85 of a member 86 provided by the hub 72. Clinder 80 is closed at its inner end by the hub 72 and at its outer end by a cap 87. The inclinations of the helical splines are such that inward movement of the piston 84 effects pitch-increasing rotation of the blade 74. As shown in Fig. 6, the hub 72 supports and drives a plate 90 fastened to the hub by a tubular nut 91 threadedly engaging the hub at 92. Nut 91 is surrounded by annular members 93, 94 and 95 which are fastened together in any suitable manner so as to provide in effect a single tubular member marked 95' in Fig. 4. To the plate 90 there is attached a cover 100 which together with parts 93, 94 and 95 provide an annular chamber for containing hydraulic fluid. Plate 90 and cover 100 provide bearings 101 and 102 respectively for supporting the parts 93 and 94. There is an oil seal 103 between part 93 and plate 90 and there is an oil seal 104 between part 95 and cover 100. Rotation of parts 93, 94 and 95 is prevented by providing part 95 (95' in Fig. 4) with a tang 96 confined between brackets 97 attached to the engine frame 70. Part 93 provides a stationary gear 98 meshing with one or more gears 99 for driving oil pumps as shown in Fig. 4. Part 95 supports a ring gear 105 having an operating handle 106 and meshing with a plurality of small gears 107, each connected with a shaft 108 rotatably supported by the part 94 (Fig. 6). Each shaft 108 is provided with screw threads 109 for engaging a groove control ring 110 which receives a shoe 111 attached to a carriage 112 of Fig. 4 having rollers 113 received by channel shaped guides 114 provided by the valve body 115 which provides the cylinder 50 of valve unit D. The roller 55 of valve unit D (Fig. 1) is carried by the carriage 112. The various parts of units B, C and D and some of the oil passages of Fig. 1 are marked in Fig. 4 with reference numerals used in Fig. 1.

Figure 5:
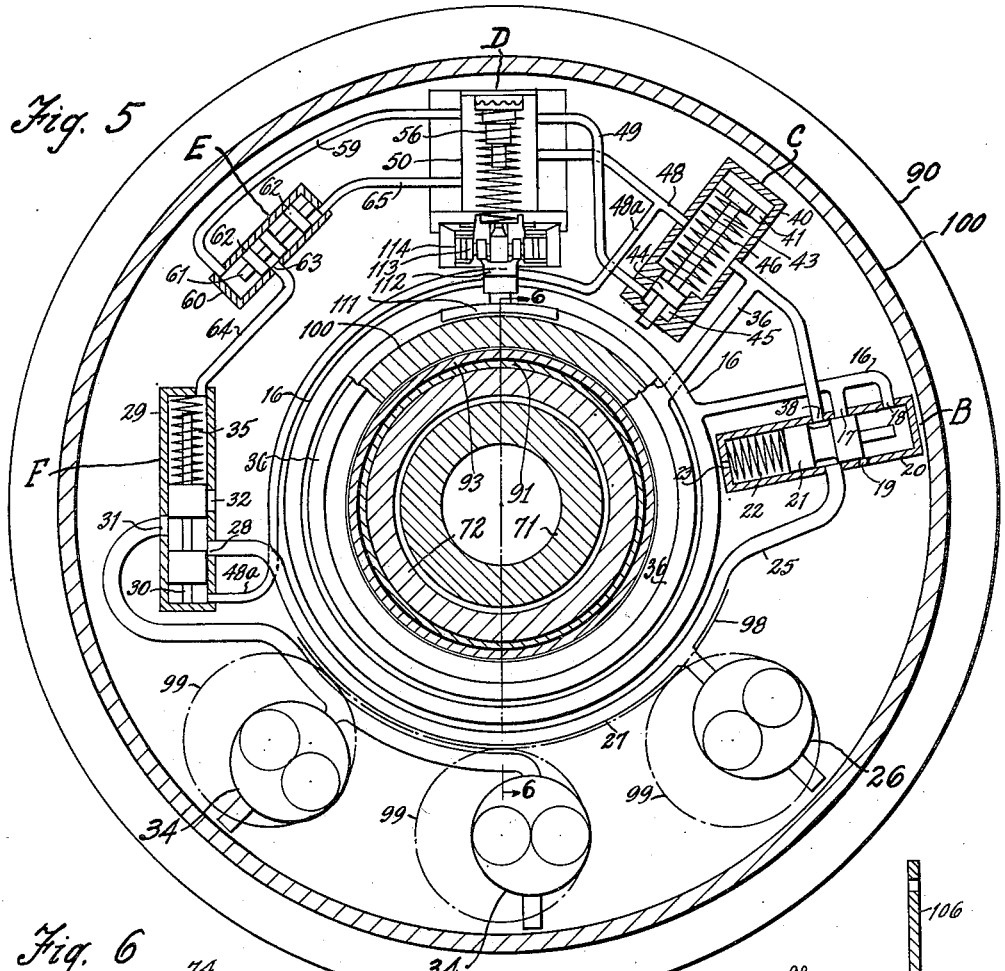
Fig. 5 is a sectional view on line 5—5 of Fig. 4.
Figure 6:
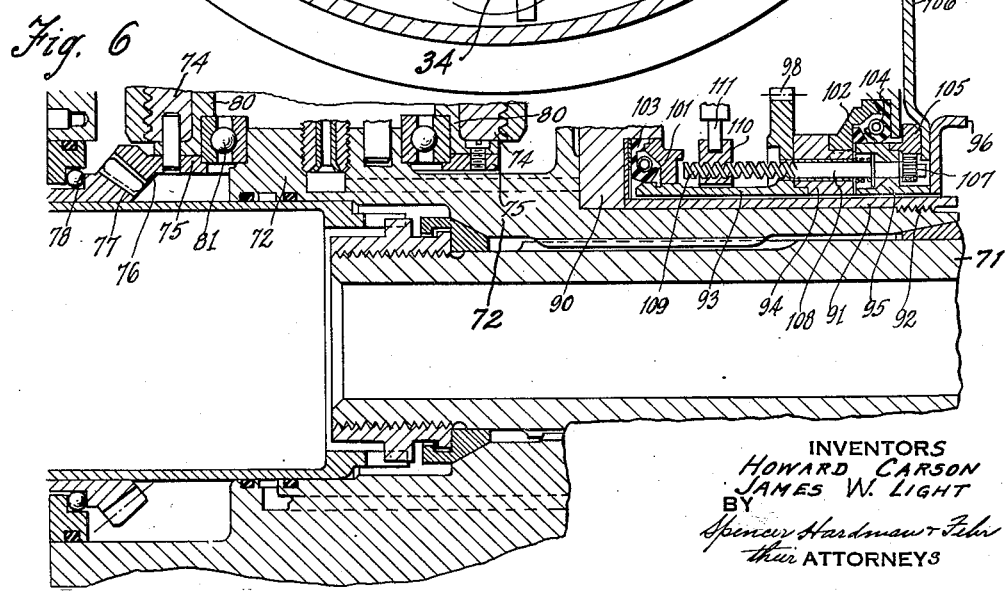
Fig. 6 is a fragmentary sectional view on line 6—6 of Fig. 5.

Fig. 5 shows an arrangement of the instruments of Fig. 1 upon the plate 90. In this figure, the instruments and ducts are marked as shown in Figs. 1, 2 and 3. Ducts 16 and 36 may be arcuate as shown in Fig. 5 and may be connected by branch passages with a plurality of torque units in the manner indicated in Fig. 4. Fig. 1 shows a single pump 34 of larger capacity than the pump 26. Fig. 5 shows two pumps 34 connected in parallel, each of which may have the capacity of the pump 26.

While the embodiment of the present invention as herein disclosed, constitutes a preferred form, it is to be understood that other forms might be adopted, all coming within the scope of the claims which follow.

What is claimed is as follows:

1. Apparatus for controlling pitch of propeller blades comprising a servomotor having a cylinder and a blade rotating piston, a fluid pressure source, means for limiting the pressure in the pitch-decreasing end of the cylinder to a value sufficient for decreasing blade pitch, a bleed port connected with the pitch-increasing end of the cylinder, a valve for controlling the port and urged by pressure in the pitch-increasing end of the cylinder toward port opening position, means for opposing such movement of the valve including means for hydraulically loading the valve, and speed responsive means effective, when on speed, to effect such hydraulic loading of the valve as to obtain a pressure in the pitch-increasing end of the cylinder sufficient to hold the piston stationary, and effective, when there is over-speed or under-speed, to increase or decrease, respectively, the hydraulic loading of said valve.

2. Apparatus for controlling pitch of propeller blades comprising a servomotor having a cylinder and a blade rotating piston, a fluid pressure source, means for limiting the pressure in the pitch-decreasing end of the cylinder to a value sufficient for decreasing blade pitch, a bleed port connected with the pitch-increasing end of the cylinder, a piston valve for controlling the port, a cylinder for receiving the valve, a spring urging the valve toward port closing position, a pressure fluid connection between the pitch-decreasing end of the servomotor cylinder and an end of the valve cylinder to provide pressure upon the piston valve to urge it toward port opening position, a pressure fluid connection between the source and the other end of the valve cylinder to provide a pressure upon the piston valve to urge it toward port closing position, and a speed responsive valve for controlling the second mentioned connection.

3. Apparatus for controlling pitch of propeller blades comprising a servomotor having a cylinder and a blade rotating piston, a fluid pressure source, means for limiting the pressure in the pitch-decreasing end of the cylinder to a value sufficient for decreasing blade pitch, a bleed port connected with the pitch-increasing end of the cylinder for limiting the pressure in the pitch-increasing end of the servo cylinder to a value sufficient for opposing decrease-pitch change during on-speed operation, means for controlling the port including a cylinder and a spring loaded piston valve means applying the fluid pressure source to one side of said spring loaded piston, and means for hydraulically loading the spring loaded piston in proportion to error of blade pitch for effecting differential of pressures in the cylinder on opposite sides of the spring loaded piston, and speed responsive means for controlling the pressure differential.

4. Apparatus for controlling pitch of propeller blades comprising a servomotor having a cylinder and a blade rotating piston, a first fluid pressure pump, means responsive to speed-error for controlling the differential of pressure acting upon the servomotor piston, a second fluid pressure pump, a valve for controlling a connection between the outlet of the second pump and the outlet of the first pump, a spring for moving the valve in the direction to connect the outlets of both pumps with the servomotor, fluid pressure means for moving said valve in the other direction to disconnect one of the pumps from the servomotor, and means for controlling the fluid pressure means and operating when there is a substantial speed-error for reducing the effectiveness of the fluid pressure means whereby the spring is effective to move the valve in the first mentioned direction.

5. Apparatus for controlling pitch of propeller blades comprising a servomotor having a cylinder and a blade rotating piston, a first fluid pressure pump, means responsive to speed-error for controlling the differential of pressures acting upon the servomotor piston, a second fluid pressure pump, a valve for controlling a connection between the outlet of the second pump and the outlet of the first pump, a spring for moving the valve in the direction to connect the outlets of both pumps with the servomotor, fluid pressure means acting against the spring for moving the valve in the other direction to disconnect one of the pumps from the servomotor, a second fluid pressure means for opposing the first fluid pressure means, and speed-error responsive means for so controlling the second fluid pressure means that, when on speed, the force of the second fluid pressure means plus the force of the spring is less than the force of the first fluid pressure means and that, when there is a substantial speed-error, the force of the second fluid pressure means is substantially equal to the force of the first fluid pressure means whereby the spring is effective to move the valve in the first mentioned direction.

6. Apparatus for controlling pitch for propeller blades comprising a servomotor having a cylinder and a blade rotating piston, a first fluid pressure pump for operating the servomotor, means responsive to speed-error for controlling the differential of pressures acting upon the servomotor piston, a second fluid pressure pump, a piston valve for controlling the connection of the outlet of the second pump with drain or with the outlet of the first pump, a cylinder enclosing said valve, a spring for moving the valve toward position for connecting the outlet of the second pump with the outlet of the first pump, a pressure connection to an end of the valve cylinder for applying pressure to move the valve against the action of the spring to connect the outlet of the second pump with drain, a pressure connection to the other end of the valve cylinder for applying pressure in the opposite direction, and means for controlling the pressure last mentioned and operating upon substantial speed-error to reduce the pressure differential to such low value that the spring moves the valve to connect the second pump outlet with the first pump outlet.

7. Apparatus for controlling pitch of propeller blades comprising a servomotor having a cylinder and a blade rotating piston, a fluid pressure source for application to both sides of said piston, pressure limiting means for applying the source pressure to the decrease-pitch end of said cylinder and including a bleed port for reducing the limited pressure applied to a value sufficient for decreasing blade pitch, pressure control means for applying the source pressure to the increase-pitch end of said cylinder and including a bleed port for reducing the controlled pressure applied to a value sufficient for increasing blade pitch, said limited pressure and controlled pressure being applied to opposite sides of the servo piston for effective opposition to piston movement during pitch maintained position, means hydraulically loading the pressure control valve in opposition to the source pressure for effecting a differential of pressure on said servo piston during increase pitch shifting of said blades, means variably reducing the hydraulic loading of the pressure control valve during decrease pitch shifting of said blades, and valve means responding to change in speed of propeller operation for controlling the hydraulic loading of said valve, an increase of speed effecting an increase of loading for the pressure control valve and an increase of blade pitch.

HOWARD CARSON.
JAMES W. LIGHT.

REFERENCES CITED

The following references are of record in the file of this patent:

UNITED STATES PATENTS

| Number | Name | Date |
| --- | --- | --- |
| 2,112,965 | Koster | Apr. 5, 1938 |
| 2,205,625 | Mader | June 25, 1940 |
| 2,257,126 | Rindfleisch | Sept. 30, 1941 |
| 2,307,849 | Mullen | Jan 12, 1943 |
| 2,310,261 | Schwartzhaupt et al. | Feb. 9, 1943 |

FOREIGN PATENTS

| Number | Country | Date |
| --- | --- | --- |
| 501,054 | Great Britain | Feb. 20, 1939 |